US011628359B2

United States Patent
Furumoto et al.

(10) Patent No.: US 11,628,359 B2
(45) Date of Patent: Apr. 18, 2023

(54) GAME MANAGEMENT METHOD, GAME MANAGEMENT SYSTEM, AND GAME MANAGEMENT PROGRAM FOR SYNCHRONIZING GAME PROGRESS AT A PLURALITY OF DEVICES IN DIFFERENT COMMUNICATION STATES

(71) Applicant: GREE, INC., Tokyo (JP)

(72) Inventors: Tomohiko Furumoto, Tokyo (JP); Masato Nagai, Tokyo (JP)

(73) Assignee: GREE, INC., Tokyo (JP)

( * ) Notice: Subject to any disclaimer, the term of this patent is extended or adjusted under 35 U.S.C. 154(b) by 57 days.

(21) Appl. No.: 17/110,281

(22) Filed: Dec. 2, 2020

(65) Prior Publication Data

US 2021/0086074 A1 Mar. 25, 2021

Related U.S. Application Data

(60) Division of application No. 16/734,207, filed on Jan. 3, 2020, now abandoned, which is a continuation of
(Continued)

(30) Foreign Application Priority Data

Jan. 30, 2014 (JP) ................................. 2014-015580

(51) Int. Cl.
*A63F 13/48* (2014.01)
*A63F 13/35* (2014.01)
(Continued)

(52) U.S. Cl.
CPC .............. *A63F 13/48* (2014.09); *A63F 13/35* (2014.09); *A63F 13/358* (2014.09); *A63F 13/77* (2014.09);
(Continued)

(58) Field of Classification Search
CPC ........ A63F 13/35; A63F 13/358; A63F 13/48; A63F 2300/53; A63F 2300/534; A63F 2300/535
See application file for complete search history.

(56) References Cited

U.S. PATENT DOCUMENTS 5,775,996 A * 7/1998 Othmer ................... A63F 13/34
463/40
5,899,810 A * 5/1999 Smith ...................... A63F 13/12
463/42
(Continued)

FOREIGN PATENT DOCUMENTS

JP 2004-523326 8/2004
JP 2007-260410 10/2007
(Continued)

OTHER PUBLICATIONS

Office Action issued in corresponding Japanese Application No. 2015/056054 dated Jul. 1, 2015 (with English translation).
(Continued)

*Primary Examiner* — William H McCulloch, Jr.
(74) *Attorney, Agent, or Firm* — Oblon, McClelland, Maier & Neustadt, L.L.P.

(57) ABSTRACT

A game management system that retrieves a delay time of each of a plurality of user devices playing a game; stores the delay times retrieved from each of the plurality of user devices; and transmits an instruction to synchronize game progress to each of the user devices, the instruction including an offset time determined based on a maximum value of the stored delay times.

14 Claims, 7 Drawing Sheets

Related U.S. Application Data application No. 16/417,200, filed on May 20, 2019, now Pat. No. 10,549,192, which is a continuation of application No. 16/133,292, filed on Sep. 17, 2018, now Pat. No. 10,322,341, which is a continuation of application No. 14/607,764, filed on Jan. 28, 2015, now Pat. No. 10,105,598.

(51) Int. Cl.
*A63F 13/358* (2014.01)
*A63F 13/77* (2014.01)

(52) U.S. Cl.
CPC ..... *A63F 2300/53* (2013.01); *A63F 2300/534* (2013.01); *A63F 2300/535* (2013.01)

(56) References Cited

U.S. PATENT DOCUMENTS

| | | | | |
|---|---|---|---|---|
| 6,025,801 | A * | 2/2000 | Beitel | A63F 13/12 463/42 |
| 6,042,477 | A * | 3/2000 | Addink | G06F 1/14 713/375 |
| 6,361,440 | B1 * | 3/2002 | Ogawa | A63F 13/31 709/200 |
| 7,803,054 | B1 * | 9/2010 | Ogus | A63F 13/358 463/31 |
| 8,317,580 | B2 * | 11/2012 | Kikuchi | A63F 13/42 463/2 |
| 8,678,929 | B1 * | 3/2014 | Nishimura | A63F 13/798 463/31 |
| 9,554,061 | B1 | 1/2017 | Proctor, Jr. | H04S 7/00 |
| 9,674,267 | B2 * | 6/2017 | Fiedler | A63F 13/577 |
| 9,849,389 | B2 * | 12/2017 | Gould | H04L 67/55 |
| 9,919,211 | B2 * | 3/2018 | Lockton | A63F 13/22 |
| 10,080,968 | B2 * | 9/2018 | Gould | A63F 13/35 |
| 10,105,598 | B2 * | 10/2018 | Furumoto | A63F 13/48 |
| 10,150,031 | B2 * | 12/2018 | Lockton | A63F 13/285 |
| 10,322,341 | B2 * | 6/2019 | Furumoto | A63F 13/77 |
| 10,456,688 | B2 * | 10/2019 | Gould | H04L 67/02 |
| 10,511,666 | B2 * | 12/2019 | Ohara | A63F 13/355 |
| 10,549,192 | B2 * | 2/2020 | Furumoto | A63F 13/35 |
| 2002/0142843 | A1 * | 10/2002 | Roelofs | A63F 13/10 463/42 |
| 2004/0087372 | A1 * | 5/2004 | Yamana | H04L 9/40 463/42 |
| 2004/0152519 | A1 * | 8/2004 | Wang | G06Q 30/00 463/42 |
| 2005/0059491 | A1 * | 3/2005 | Oh | G07F 17/3276 463/42 |
| 2005/0192098 | A1 * | 9/2005 | Guo | H04L 67/62 463/42 |
| 2006/0135258 | A1 * | 6/2006 | Maheshwari | G07F 17/32 463/42 |
| 2006/0195522 | A1 | 8/2006 | Miyasaki | |
| 2006/0247046 | A1 * | 11/2006 | Choi | A63F 13/44 463/36 |
| 2007/0111797 | A1 * | 5/2007 | Sasaki | A63F 13/34 463/42 |
| 2007/0198658 | A1 * | 8/2007 | Aggarwal | H04L 67/1095 709/219 |
| 2008/0126568 | A1 * | 5/2008 | Otoshi | A63F 13/358 709/248 |
| 2010/0022302 | A1 * | 1/2010 | Iwakiri | H04J 3/0682 709/248 |
| 2012/0165100 | A1 * | 6/2012 | Lalancette | A63F 13/44 709/248 |
| 2013/0290956 | A1 * | 10/2013 | Kruglick | H04L 43/0852 718/1 |
| 2014/0213367 | A1 * | 7/2014 | Fiedler | A63F 13/34 463/42 |
| 2015/0209670 | A1 * | 7/2015 | Furumoto | A63F 13/358 463/24 |
| 2016/0112515 | A1 * | 4/2016 | Ohara | H04L 67/01 709/203 |
| 2019/0022527 | A1 * | 1/2019 | Furumoto | A63F 13/48 |
| 2019/0270009 | A1 * | 9/2019 | Furumoto | A63F 13/35 |

FOREIGN PATENT DOCUMENTS

| | | |
|---|---|---|
| JP | 4275136 | 3/2009 |
| JP | 2010-134800 | 6/2010 |
| JP | 5602963 B1 | 10/2014 |

OTHER PUBLICATIONS

Office Action issued in corresponding Japanese Application No. 2014/015580 dated Apr. 23, 2014 (with English translation).
Office Action issued in corresponding Japanese Application No. 2014/167478 dated Nov. 28, 2014 (with English translation).

* cited by examiner

GAME MANAGEMENT METHOD, GAME MANAGEMENT SYSTEM, AND GAME MANAGEMENT PROGRAM FOR SYNCHRONIZING GAME PROGRESS AT A PLURALITY OF DEVICES IN DIFFERENT COMMUNICATION STATES

CROSS-REFERENCE TO RELATED APPLICATIONS

This application is a divisional of U.S. application Ser. No. 16/734,207, filed Jan. 3, 2020, which is a continuation of U.S. application Ser. No. 16/417,200, filed May 20, 2019, which is a continuation of U.S. application Ser. No. 16/133,292, filed Sep. 17, 2018, now U.S. Pat. No. 10,322,341, issued Jun. 18, 2019, which is a continuation of U.S. application Ser. No. 14/607,764, filed Jan. 28, 2015, now U.S. Pat. No. 10,105,598, issued Oct. 23, 2018, which claims the benefit of Japanese Priority Application No. JP 2014-015580, filed Jan. 30, 2014. The entire contents of each of these documents are incorporated herein by reference.

BACKGROUND

The present disclosure relates to a game management method, a game management system and a game management program, and more specifically to a method, system, and program for synchronizing game progress at a plurality of computer devices in different communication states.

In recent years, application software such as various online games has been provided to users using computer devices such as smartphones. Such computer devices can be connected to other computer devices via a network such as the Internet so that the users of the computer devices can enjoy a game match with players distant from the users.

However, a communication delay may occur between computer devices connected via a communication network. Therefore, data processing methods have been considered in which data is processed almost simultaneously in computer devices. For example, see Japanese Laid-Open Patent Publication No. 2007-260410. The server described in the document previously measures a delay time between the server and each computer device before a game starts when the users of a plurality of computer devices having a communication delay play a computer game via a network. The server synchronizes a time counted by each computer device based on the delay time. In the progress of the game, an operation data signal is processed when the maximum delay time among the previously-measured delay times elapses since the operation data signal is generated. Thereby, the computer devices process the operation data signal simultaneously.

However, a communication state of client devices may change during a game. In this case, the synchronization of the game progress may fail.

SUMMARY

It is an objective of the present disclosure to provide a method, system and program for synchronizing game progress at a plurality of computer devices in different communication states.

To achieve the foregoing objective and in accordance with one aspect of the present disclosure, a game management method using a game management system is provided. The system includes a control unit connected to a plurality of user devices and adapted to manage game progress and a storage unit for storing delay times of the user devices. The control unit continuously retrieves a delay time of each of the user devices playing a game in a group, and stores the delay time in the storage unit, and transmits an instruction of synchronizing a game progress including a moratorium time to each user device based on a maximum value of the delay times stored in the storage unit in order to synchronize the game progress of the game management system and each of the user devices.

In accordance with another aspect of the present disclosure, a non-transitory computer-readable recording medium is provided that stores therein a program for executing a game management method by use of a computer. The computer includes a control unit connected to a plurality of user devices and adapted to manage game progress and a storage unit for storing delay times of the user devices. When the program is executed, the control unit is operable to: continuously retrieve a delay time of each of the user devices playing a game in a group and store the delay time in the storage unit; and transmit an instruction of synchronizing a game progress including a moratorium time to each user device based on a maximum value of the delay times stored in the storage unit in order to synchronize the game progress between the game management system and each of the user devices.

In accordance with a further aspect of the present disclosure, a game management system is provided that includes a control unit connected to a plurality of user devices and adapted to manage game progress and a storage unit for storing delay times of the user devices. The control unit continuously retrieves a delay time of each of the user devices playing a game in a group and stores the delay time it in the storage unit. The control unit also transmits an instruction of synchronizing a game progress including a moratorium time to each user device based on a maximum value of the delay times stored in the storage unit in order to synchronize the game progress between the game management system and the user device.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the presently preferred embodiments together with the accompanying drawings in which.

DETAILED DESCRIPTION OF THE PREFERRED EMBODIMENTS

One embodiment of a game management method will be described below with reference to FIGS. 1 to 6. In the present embodiment, it is assumed that a game management system provides a plurality of user devices (clients) with game contents (role-playing game) played in synchronization. The game progress is managed by step numbers incremented over time.

Figure 1:
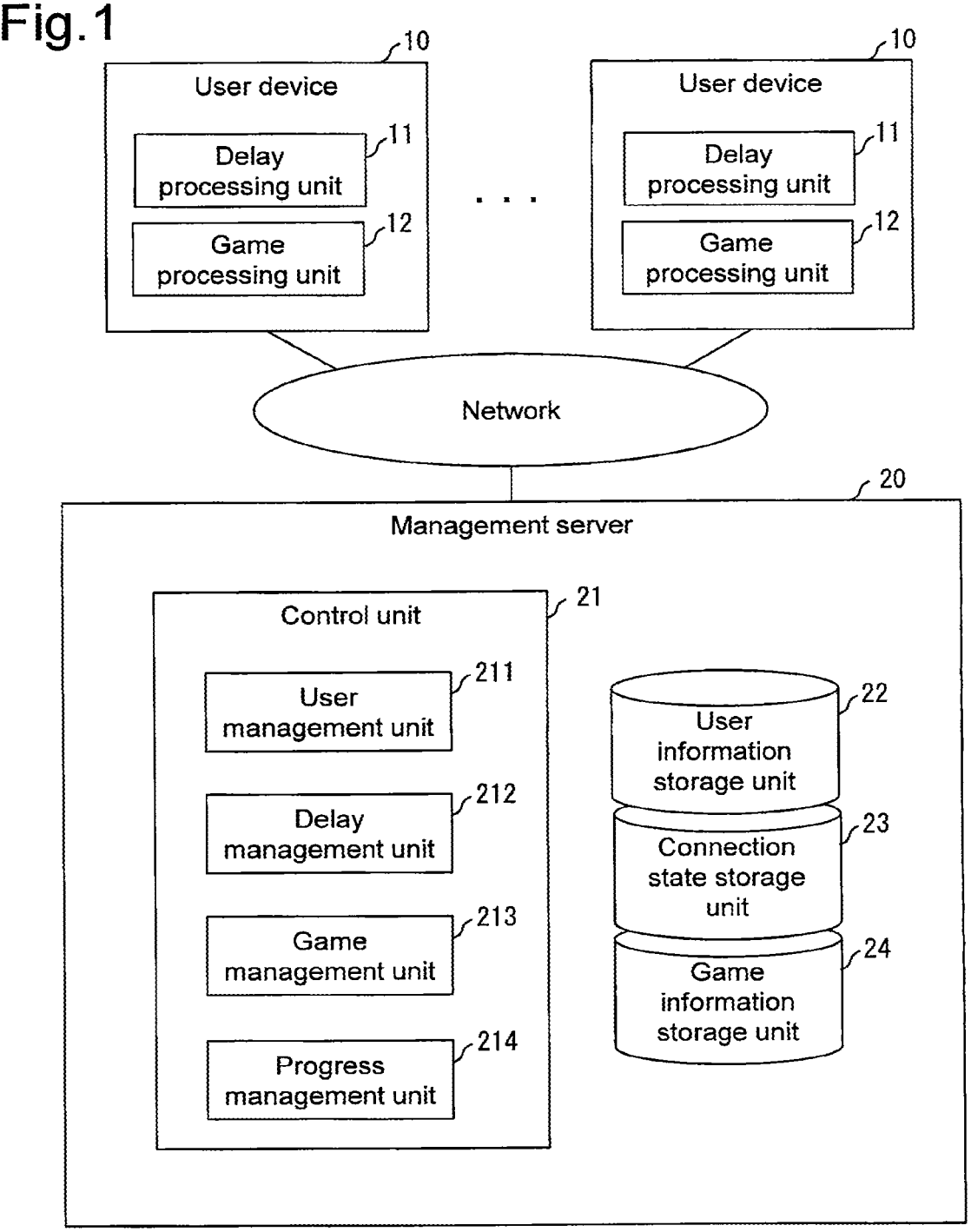
FIG. 1 is a schematic diagram of a system according to one embodiment.

As illustrated in FIG. 1, in the present embodiment, a plurality of user devices 10 are connected to a management server 20 (game management system) via a network such as the Internet.

The user devices 10 are computer devices (information processing devices such as smartphones) used by users playing a game. Each user device 10 includes a communication unit as well as an input unit and an output unit such a touch panel display. The user device 10 further includes a delay processing unit 11 and a game processing unit 12 as control units including a CPU, a RAM, and ROM.

The delay processing unit 11 continuously measures latency for a connection state with the management server 20, or a delay time between a request for data transfer or the like and a return of its result, and transmits the measured latency to the management server 20. In the present embodiment, although it is assumed that the delay processing unit 11 periodically measures latency for continuous measurement, the delay processing unit 11 can irregularly or continuously measure latency. That is, a measurement time interval may be "irregular" or "continuous." Further, the game processing unit 12 stores data on latency transmitted to the management server 20.

The game processing unit 12 functions by an application for game-playing, and manages a game progress. Further, the game processing unit 12 transmits a request corresponding to a user operation to the management server 20 and performs an event based on an instruction retrieved from the management server 20.

The management server 20 is a server computer that provides each user device 10 with various game contents.

The management server 20 includes a control unit 21 including a CPU, a RAM, and a ROM, a user information storage unit 22, a connection state storage unit 23, and a game information storage unit 24. The control unit 21 functions as a user management unit 211, a delay management unit 212, a game management unit 213, and a progress management unit 214 by executing a management program.

The user management unit 211 manages users using the game.

The delay management unit 212 manages a connection state with each user device 10. Specifically, the delay management unit 212 retrieves latency information from each user device 10 and determines a connection state of the corresponding user device 10. The delay management unit 212 further stores data on a threshold for determining a user device 10 (client abnormality) that has a high latency and a hindrance in the game progress.

The game management unit 213 manages the game progress in each user device 10. In the present embodiment, the game management unit 213 starts the game for each user device 10, retrieves a request from the user device 10, notifies an event occurring in the game progress and the like. The game management unit 213 manages the game progress based on an elapsed time (step number) after the start of the game. Specifically, the game management unit 213 synchronizes the game progress between each user device 10 as a client and the management server 20 based on the step number. When retrieving a request inconsistent with the game progress in the management server 20 from the user device 10, the game management unit 213 handles the request as an unauthorized activity by the user device 10.

The progress management unit 214 manages the game progress in the management server 20. The progress management unit 214 synchronizes the game progress in the management server 20 and the game progress in each user device 10.

The user information storage unit 22 stores user information on users playing the game. The user information storage unit 22 stores the user information on user registrations. The user information includes data on client ID and attributes.

The client ID data area records therein data on identifiers for identifying each user.

The attribute data area records therein data on attributes of the users. The attributes include information on a user group to which the user belongs as well as skills and items of a game character of the user.

The connection state storage unit 23 stores connection management information for managing a connection state with a user device 10. The connection management information is registered when the user device 10 is connected to the management server 20. The connection management information includes data on group IDs, client IDs, latency, and statuses.

The group ID area records therein data on an identifier for identifying a user group made of users playing the game in synchronization with the first user.

The client ID data area records therein data on an identifier for identifying each user device 10 (client) included in the user group.

The latency data area records therein data on a connection state (latency, herein) with each client (user device 10).

The status data area records therein information for determining validity of a request retrieved from each client. In the present embodiment, an abnormality flag is recorded in the status data area for a client having a higher latency than a threshold. A request from the user device 10 of a client for which an abnormality flag is recorded in the status data area is determined as unauthorized.

The game information storage unit 24 stores game management information on the game progress situation. The game management information is registered when the user plays the game, and is updated during the game. The game management information includes data on group IDs, client IDs, a game being used, and a progress situation.

The group ID area records therein data on an identifier for identifying a user group to which each user belongs.

The client ID data area records therein data for an identifier for identifying each user device 10 included in the user group.

The using game data area records therein data on an identifier for identifying the game used by the user group.

The progress situation data area records therein data on a progress situation of the game. In the present embodiment, an event (such as operation for object arrangement or the like) in each client is recorded in association with the step number as a counted game progress.

A game management method when the users of the user devices 10 of the clients A to C play a game in one user group by use of above the system will be described below.

Latency Management Process

Figure 2:
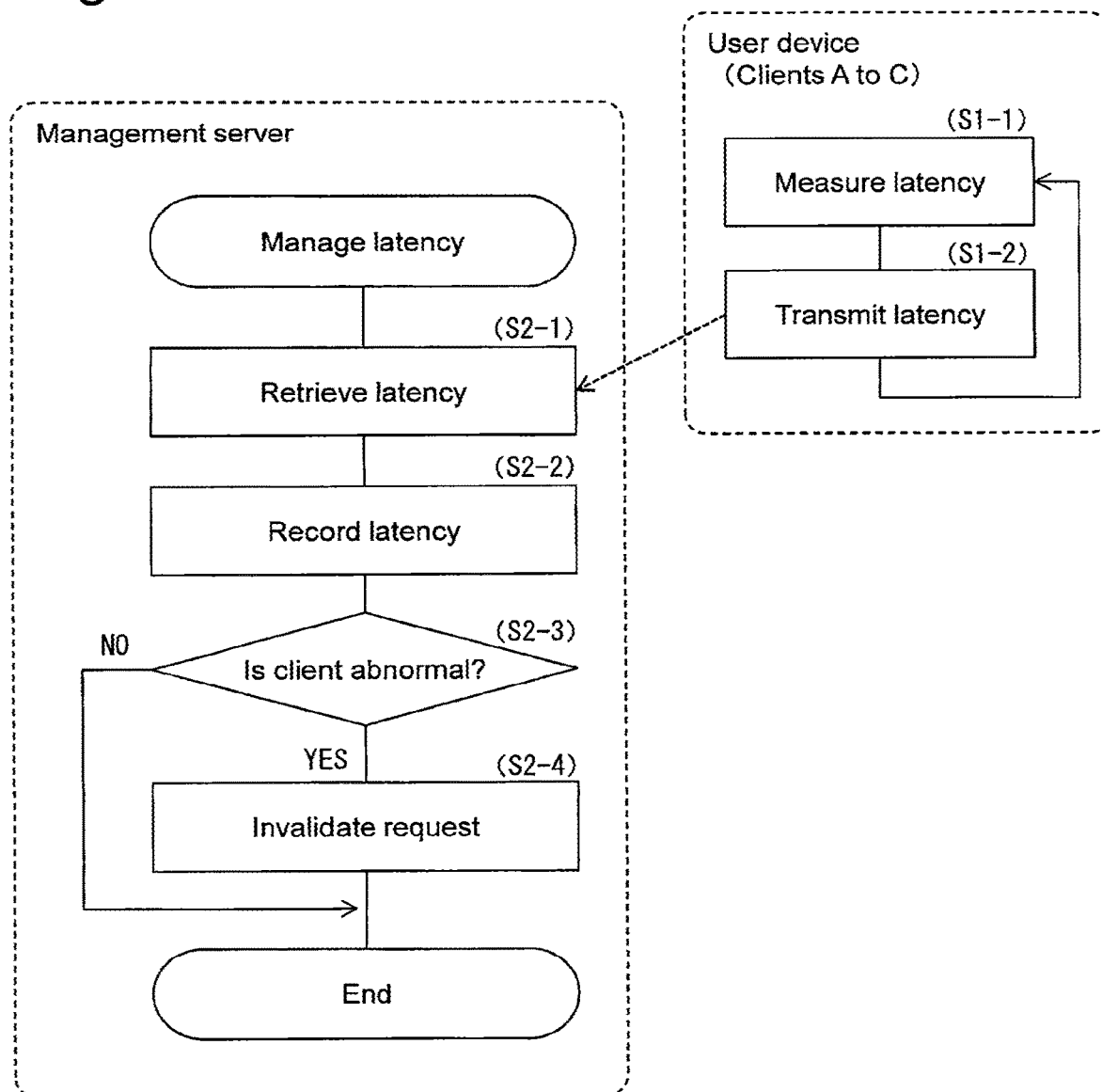
FIGS. 2 to 4 are explanatory diagrams of processing procedures of the system of FIG. 1.
Figure 5:
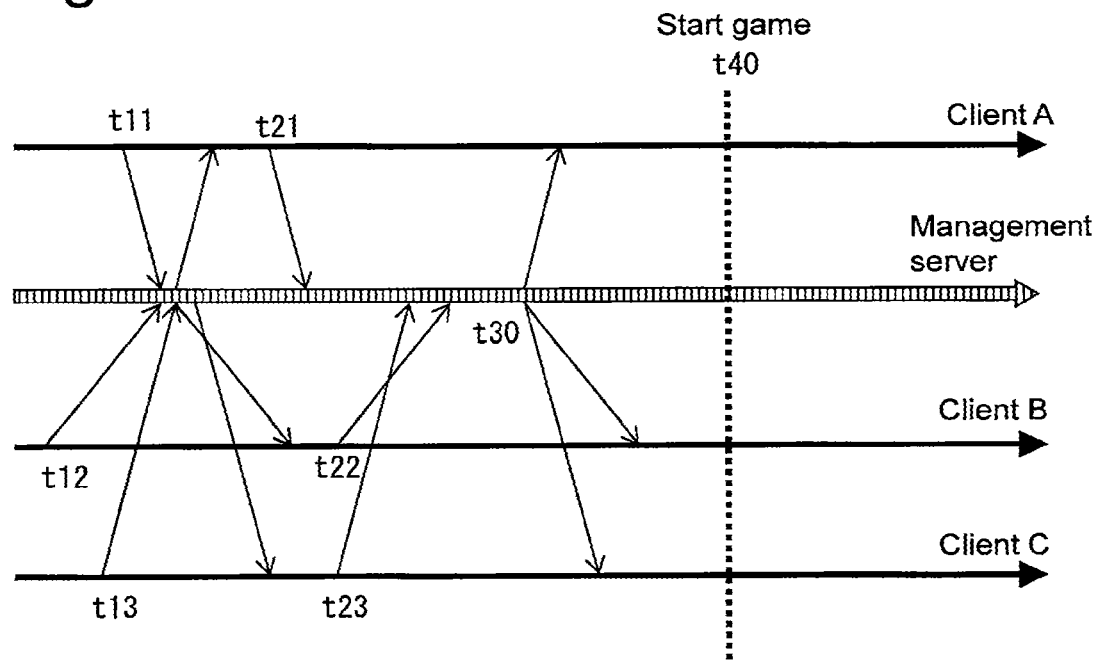
FIGS. 5 and 6 are timing charts of the system of FIG. 1.

A latency management process will be first described with reference to FIGS. 2 and 5. In the latency management process, latency of each client is managed from the start of the game to the end of the game.

At first, the user device 10 periodically performs a latency measurement process (step S1-1). Specifically, the delay processing unit 11 in the user device 10 periodically transmits ping to the management server 20. When receiving the ping, the management server 20 returns a response to the ping. The delay processing unit 11 measures network latency (delay time) based on a required time from the transmission of the ping to the return. The delay processing unit 11 holds the measured latency. In FIG. 5, the clients A to C transmit ping for measuring latency at points in time t11 to t13, respectively.

The user device 10 then performs a latency transmission process (step S1-2). Specifically, the delay processing unit 11 transmits latency information to the management server 20. The latency information includes information for identifying a user device 10 and information on a latency measured in the user device 10. In FIG. 5, the clients A to C transmit the latency information at points in time t21 to t23, respectively. The user device 10 repeats the processes subsequent to the latency measurement process (step S1-1) at the next measurement timing.

The control unit 21 in the management server 20 then performs a latency retrieving process (step S2-1). Specifically, the delay management unit 212 in the control unit 21 retrieves latency information transmitted from the user device 10.

The control unit 21 then performs a latency storage process (step S2-2). Specifically, the delay management unit 212 stores latency in the connection state storage unit 23 in association with the client ID of the user device 10. When first retrieving latency, the delay management unit 212 associates the latency with the group ID and the client ID, thereby generating connection state management information, and registers the connection state management information in the connection state storage unit 23. On the other hand, when the connection state management information for the user device 10 is previously registered in the connection state storage unit 23, the delay management unit 212 updates the latency in the connection state management information to a latest latency, and stores the updated connection state management information.

The control unit 21 then performs a determination process as to whether the user device 10 is in a client abnormal state (step S2-3). Specifically, the delay management unit 212 compares the latency retrieved from the user device 10 with the threshold. When the latency is higher than the threshold, the user device 10 is determined as being in the client abnormal state.

When the latency is equal to or lower than the threshold, the delay management unit 212 determines that the user device 10 is not in the client abnormal state ("NO" in step S2-3). In this case, the control unit 21 terminates the latency management process.

On the other hand, when the delay management unit 212 determines that the user device 10 is in the client abnormal state ("YES" in step S2-3), the control unit 21 performs a request invalidation process (step S2-4). Specifically, the delay management unit 212 stores an abnormality flag as a status for the connection state management information in the connection state storage unit 23 and terminates the latency management process. During the progress of the game, the game management unit 213 ignores a request from the user device 10 for which an abnormality flag is stored.

Game Starting Process

A game starting process will be described below with reference to FIGS. 3 and 5. The process is performed when the management server 20 receives a game start request from the user device 10 (when the game is started).

The control unit 21 first performs a maximum latency identifying process (step S3-1). Specifically, the game management unit 213 in the control unit 21 retrieves connection state management information storing the same group ID therein from the connection state storage unit 23, and identifies the values of latency of the user devices 10 belonging to the same group. In this case, the game management unit 213 ignores latency for which an abnormality flag is stored. The game management unit 213 identifies the maximum value from among the identified values of latency. In the present embodiment, the values of latency of the clients A to C are assumed as 50 ms, 30 ms, and 200 ms, respectively. In this case, the maximum value of the latency is 200 ms.

The control unit 21 then performs a process of determining an offset higher than the maximum value (step S3-2). Specifically, the game management unit 213 identifies an offset (moratorium time) higher than the maximum value of the latency. A value obtained by multiplying the maximum value by a predetermined value (such as 1.5) is determined as an offset. Specifically, an offset of 300 ms (300=200×1.5) is calculated for the maximum value (200 ms). The offset calculation may employ any calculation method previously stored in the game management unit 213, and is not limited to the multiplication by a fixed number.

The control unit 21 then performs an offset notification process (step S3-3). Specifically, the game management unit 213 transmits start time information to the user device 10. The start time information includes information on the determined offset.

The control unit 21 then performs a game starting process (step S3-4). Specifically, the progress management unit 214 in the control unit 21 starts the game in the management server 20 after the offset elapses. In FIG. 5, the progress management unit 214 starts the game at a point in time t40 after the offset elapses. The progress management unit 214 advances the game by incrementing the step number at predetermined intervals.

On the other hand, the user device 10 that has received the offset performs a start standby process (step S4-1). Specifically, the game processing unit 12 in the user device 10 calculates the start time of the game by subtracting the latency stored in the delay processing unit 11 from the offset retrieved from the management server 20. For example, the start times of the clients A to C are 250 ms [300 ms-50 ms], 270 ms [300 ms-30 ms], and 100 ms [300 ms-200 ms], respectively. The game processing unit 12 stands by for the start time.

When the start time passes by, the user device 10 performs a game starting process (step S4-2). Specifically, the game processing unit 12 starts the game. In FIG. 5, the clients A to C start the game at the point in time t40 after the offset elapses. Each game processing unit 12 increments the step number at predetermined intervals, thereby advancing the game.

Request Handling Process

Figure 4:
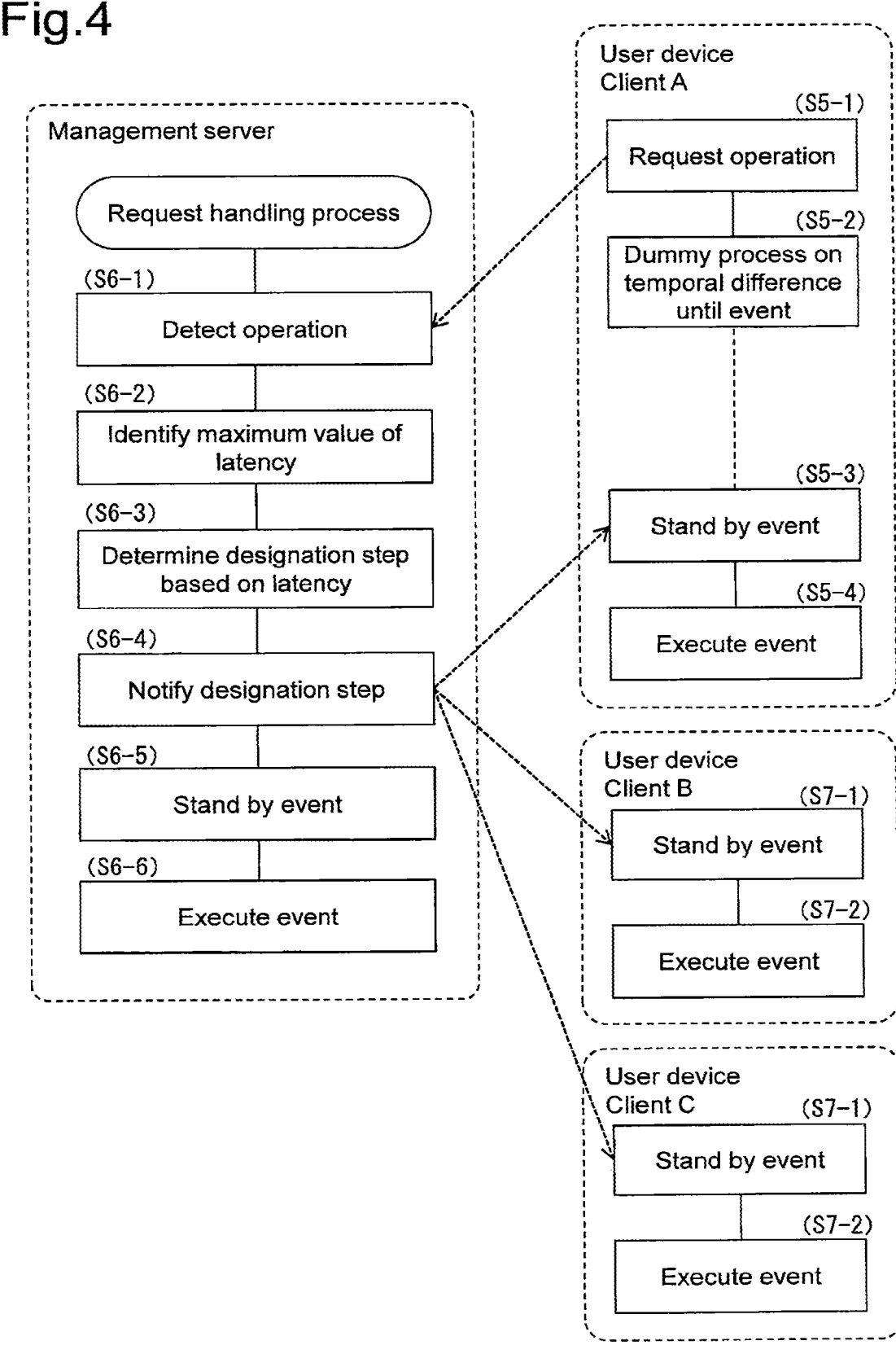

A request handling process will be described below with reference to FIG. 4. It is assumed herein that a request is retrieved from the user device 10 of the client A.

Figure 6:
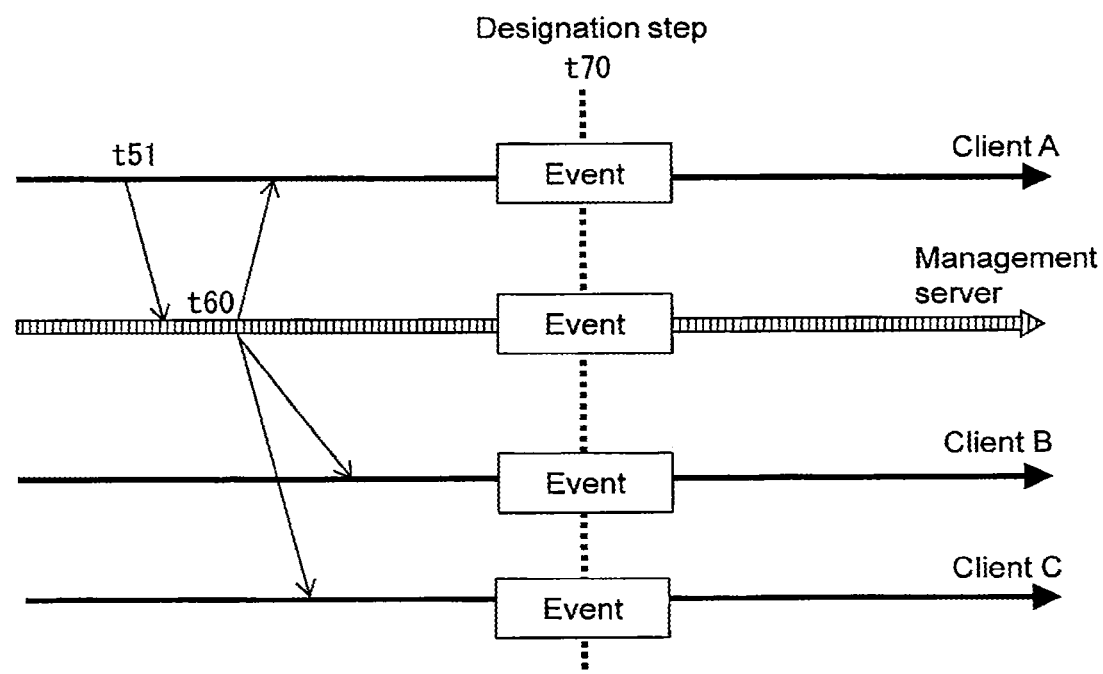

At first, the user device 10 performs an operation requesting process (step S5-1). Specifically, the game processing unit 12 determines an event based on a user operation. An object arrangement is assumed as an event. In this case, the game processing unit 12 of the client A calculates a step number in consideration of the latency at the client A. A value (server step number) obtained by adding the value obtained by dividing the latency by a step unit time to the step number (local step number) on the operation at the client A is calculated. The game processing unit 12 transmits an object arrangement request to the management server 20. The request includes data on kind of object, arrangement position and server step number. In FIG. 6, the client A transmits the object arrangement request at a point in time t51.

The user device 10 then performs a dummy process on a temporal difference until an event (step S5-2). Specifically, the game processing unit 12 outputs an animation or the like indicating that the event is in preparation (object arrangement is in preparation).

After retrieving a request, the control unit 21 performs an operation detection process (step S6-1). Specifically, the game management unit 213 retrieves an operation (object arrangement) request from the user device 10 of the client A.

The control unit 21 then performs a maximum latency identifying process (step S6-2). Specifically, the game management unit 213 retrieves the connection state management information storing the same group ID therein from the connection state storage unit 23, and identifies the maximum value of the latency.

The control unit 21 then performs a designation step determination process based on latency (step S6-3). Specifically, the game management unit 213 calculates an event execution time point, in which a margin is added to the maximum value of the latency. The game management unit 213 divides the event execution time point by a step unit time, and calculates the step number for making the object arrangement.

The control unit 21 then performs a designation step notification process (step S6-4). Specifically, the game management unit 213 notifies an event to the user devices 10 of the clients A to C. The notification includes data on event contents (object arrangement at the client A) and designation step number. In FIG. 6, the management server 20 notifies a designation step for event execution at a point in time t60.

The control unit 21 then performs an event standby process (step S6-5). Specifically, the progress management unit 214 suspends the start of the event until the designation step.

The control unit 21 then performs an event execution process (step S6-6). Specifically, the progress management unit 214 stores the event (object arrangement) in the game information storage unit 24 in the progress of the game in the management server 20 in the designation step. In FIG. 6, the progress management unit 214 makes the object arrangement at a point in time t70.

The user device 10 receiving the event notification performs an event standby process (step S5-3). Specifically, the game processing unit 12 waits for the event to start until the designation step from the management server 20.

The user device 10 then performs an event execution process (step S5-4). Specifically, when the designation step arrives, the game processing unit 12 terminates the dummy, and makes the object arrangement.

Further, the user devices 10 of the client B and the client C also perform the event standby process (step S7-1) and the event execution process (step S7-2) similarly as in steps S5-3 and S5-4. In FIG. 6, the clients A to C make the object arrangement at the point in time t70.

The above described embodiment achieves the following advantages.

(1) The user device 10 performs the latency measurement process (step S1-1) and the latency transmission process (step S1-2). The control unit 21 in the management server 20 performs the latency retrieving process (step S2-1) and the latency recording process (step S2-2). Thereby, the management server 20 can determine the delay situation at each client. In particular, the processes are periodically performed to cope with changes in communication state between the server and the clients. Even if the communication state between the management server 20 and a user device 10 is changed, the management server 20 and the user device 10 can be synchronized.

(2) The progress management unit 214 manages the game progress in the management server 20. The progress management unit 214 synchronizes the game progress at the management server 20 with the game progress at each user device 10. Further, when retrieving a request inconsistent with the game progress at the management server 20 from a user device 10, the game management unit 213 handles the request as an unauthorized activity of the user device 10. Thereby, the game progress is managed at the management server 20, and thus an unauthorized activity at each client can be monitored. Furthermore, even if a communication failure occurs between a user device 10 and the management server 20, the user device 10 can continue the game after recovering from the failure.

(3) The delay management unit 212 compares the latency retrieved from a user device 10 with a threshold, and when the latency is higher than the threshold, determines that the client is abnormal. When determining that the client is abnormal ("YES" in step S2-3), the control unit 21 performs the request invalidation process (step S2-4). Thereby, effects by a client having a large delay can be restricted in the game progress. In contrast, when the latency is equal to or less than the threshold, the control unit 21 executes the request from the user device 10. Thereby, even when a communication failure occurs with a specific user device 10, the effects on the other user devices 10 is restricted.

(4) The control unit 21 performs the maximum latency identifying process (step S3-1), the process for determining an offset higher than the maximum value (step S3-2), and the offset notification process (step S3-3). Thereby, a client with a large delay can start the game simultaneously. The game progress can be synchronized between the user devices 10 at the clients and the management server 20.

(5) The user device 10 performs the operation requesting process (step S5-1). In this case, the game processing unit 12 calculates the step number in consideration of the latency at the client A. Thereby, the step number in the game progress at the management server 20 can be identified and the user device 10 can transmit a request.

Further, the user device 10 performs the dummy process on a temporal difference until an event (step S5-2). Thereby, a time from an operation at the client (object arrangement operation) to event execution (object arrangement) can be secured.

(6) The control unit 21 performs the maximum latency identifying process (step S6-2), the latency-based designation step determination process (step S6-3), and the designation step notification process (step S6-4). Thereby, also when a client with a large delay is included in the group playing the game, an event can be executed at the clients simultaneously.

The above illustrated embodiment may be modified as follows.

In the above illustrated embodiment, the control unit 21 performs the latency-based designation step determination process (step S6-3). When the latency at the first user device 10 is high, a subsequent step at the second user device 10, such as a request for the operation in the second step subsequent to the first step may precede the request for the operation in the first step at the first user device 10. That is, the management server 20 may receive a request for the operation in a subsequent step at the second user device 10 ahead of a request for the operation in the first step at the first user device 10. A designation step may be determined in consideration of such a situation.

Figure 7:
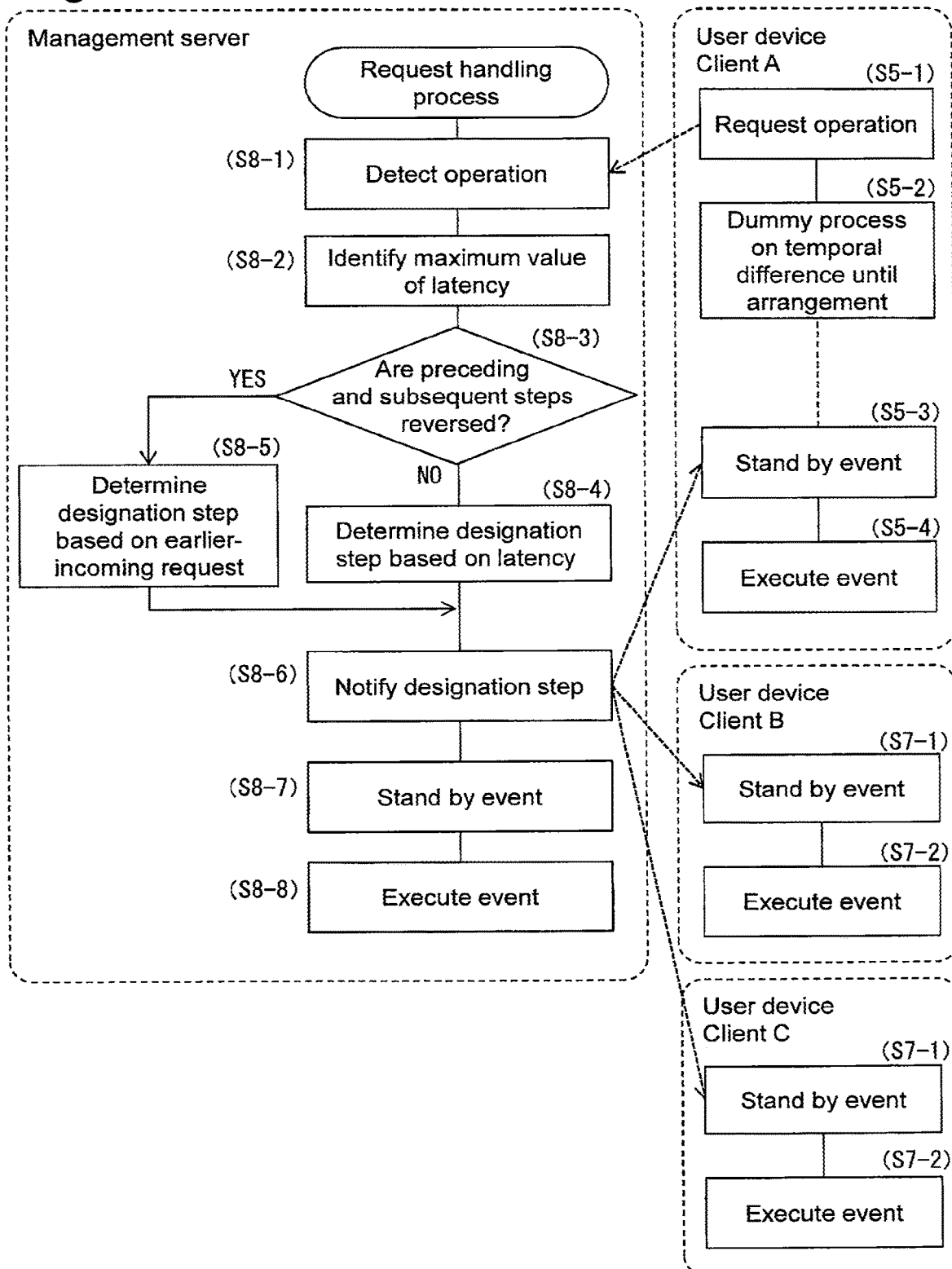
FIGS. 7 to 9 are explanatory diagrams of processing procedures of a system according to another embodiment.

The request handling process in this case will be described with reference to FIG. 7.

In this case, the control unit 21 performs the operation detection process (step S8-1) and the maximum latency identifying process (step S8-2) similarly as in steps S6-1 and S6-2.

The control unit 21 then performs a determination process as to whether the preceding and subsequent steps are reversed (step S8-3). Specifically, the game management unit 213 checks whether a request in a subsequent step has arrived earlier based on the step number included in the request. When the step number included in the later-incoming request is higher than the step number included in the earlier-incoming request, the game management unit 213 determines that the preceding and subsequent steps are reversed.

When the game management unit 213 determines that the preceding and subsequent steps are not reversed ("NO" in step S8-3), the control unit 21 performs the latency-based designation step determination process similarly as in step S6-3 (step S8-4).

On the other hand, when the game management unit 213 determines that the preceding and subsequent steps are reversed ("YES" in step S8-3), the control unit 21 performs the designation step determination process based on the earlier-incoming request (step S8-5). Specifically, the game management unit 213 designates a later step than the designation step for the earlier-incoming request. An event execution time point is calculated in which a margin is added to the maximum value of the latency. The game management unit 213 divides the event execution time point by a step unit time, thereby calculating the step number for executing the event (object arrangement). The game management unit 213 checks whether the calculated step number is higher than the designation step for the earlier-incoming request. When the step number is lower than the designation step for the earlier-incoming request, the game management unit 213 identifies, as a designation step number, the step number obtained adding the maximum value of the latency to the step number corresponding to the margin.

The control unit 21 then performs a designation step notification process (step S8-6) to an event execution process (step S8-8) similarly as in steps S6-4 to S6-6.

Thereby, when a request with a subsequent step number has arrived earlier due to a difference in latency, the request can be handled in order of arrival of requests. When an inconvenience is caused during the progress of the game due to handling of a later-incoming request, the later-incoming request can be ignored.

In the above illustrated embodiment, the connection management information for managing a connection state with the user device 10 is stored. The connection management information stores therein data on group IDs, client IDs, latency and statuses. The maximum value out of the values of latency of the clients in the user group is used to determine the game start time point or a designation step. The latency used for synchronization is not limited to the maximum value. For example, a latency history may be stored per client in the user group and an average value of the values of latency in a predetermined period may be used. In this case, the maximum value out of the average values of the values of latency of the clients in the user group is used for synchronization.

A fluctuation range may be calculated that has a certain value or less based on latency. In this case, a value including latency is used at a certain statistical probability based on the latency history. For example, a calculated value in which a standard deviation of the latency is added to an average value of the values of latency of the clients in the user group is used. The maximum value out of the calculated values is used for synchronization.

In the above illustrated embodiment, the user device 10 performs the latency measurement process (step S1-1). The user device 10 performs the latency transmission process (step S1-2). Instead, the management server 20 may measure latency. In this case, the delay management unit 212 in the control unit 21 transmits ping to the user device 10 of each client, and measures latency. The delay management unit 212 transmits latency to the user device 10 of each client.

In the above illustrated embodiment, ping is periodically transmitted to perform the latency measurement process (step S1-1). The latency measurement timing is not limited thereto. The latency measurement interval may be changed depending on the kind of the game. In this case, the delay management unit 212 stores timing information storing a latency measurement interval in association with the kind of the game. The delay management unit 212 identifies a latency measurement interval corresponding to the kind of the game to be played, and performs the latency measurement process by use of the latency measurement interval. The definition of synchronization in the progress of the game is different depending on the kind of the game. For example, some games require rigid synchronization and other games require only loose synchronization. Therefore, a request can be handled in consideration of a synchronization state (rigidity of synchronization) depending on the kind of the game.

Moreover, the latency measurement interval may be changed depending on the view of the game. In this case, the latency measurement interval is stored in association with the step number of the game progress.

Further, the latency measurement interval may be changed depending on a latency dispersion state. In this case, the delay management unit 212 identifies the latency histories of the user devices 10 belonging to the same group, and calculates the distribution of values of latency. When the values of latency change varies in a small range, for example, when the range of changes in latency in the history is smaller than or equal to a reference value, the latency measurement interval is increased. On the other hand, when the range of change in latency is large, for example, when the range of change in latency in the history exceeds the reference value, the latency measurement interval is reduced. Thereby, the game progress can be managed in consideration of a balance between the processing load and the accuracy in latency evaluation depending on the latency dispersion situation.

The latency measurement interval may be changed depending on the number of participants in the game in the group. In this case, the delay management unit 212 stores timing information storing a latency measurement interval in association with the number of participants. The delay management unit 212 identifies a latency measurement interval depending on the kind of the game to be used, and performs the latency measurement process by use of the latency measurement interval. Thereby, the game progress can be efficiently managed depending on the number of participants in the game.

In the above illustrated embodiment, when determining that the client is abnormal ("YES" in step S2-3), the control unit 21 performs the request invalidation process (step S2-4). A threshold for determining a client abnormality may be changed. In this case, the threshold may be changed depending on the kind of the game. In this case, the game management unit 213 stores threshold information storing a threshold in association with the kind of the game. The game management unit 213 identifies a threshold corresponding to the kind of the game to be used, and performs the request invalidation process by use of the threshold. Thereby, the request can be handled in consideration of a synchronization situation (rigidity of synchronization) depending on the kind of the game.

Further, the threshold may be changed depending on the view of the game. In this case, the threshold is stored in association with the step number of the game progress.

Furthermore, the threshold may be changed depending on a latency dispersion situation. In this case, the game management unit 213 identifies the latency histories of the user devices 10 belonging to the same group, and calculates the distribution of values of latency. When the values of latency varies in a small range, for example, when the range of change in latency in the history is smaller than or equal to a reference value, the threshold is increased. On the other hand, when the range of change in latency is large, for example, when the range of change in latency in the history exceeds the reference value, the threshold is reduced. Thereby, a latency permitted range can be changed depending on the latency dispersion situation, while permitting the game to progress.

Moreover, the threshold may be changed depending on the number of participants in the game in the group. In this case, the game management unit 213 stores timing information storing a threshold in association with the number of participants. The game management unit 213 identifies a threshold corresponding to the kind of the game to be used, and performs the request invalidation process by use of the threshold. In this case, when the number of participants in the game is large, the game management unit 213 increases the threshold, thereby widening the permitted range. Thereby, the game progress can be efficiently managed depending on the number of participants in the game.

In the above illustrated embodiment, the user device 10 performs the game starting process (step S4-2). The user device 10 of each client participating in the game starts the game simultaneously, and synchronizes the step number of the game progress. The step number may be synchronized during the game progress. In this case, the management server 20 performs a halfway adjusting process. In this case, the game management unit 213 stores data on a threshold (delay step number) for determining whether synchronization is necessary.

Figure 8:
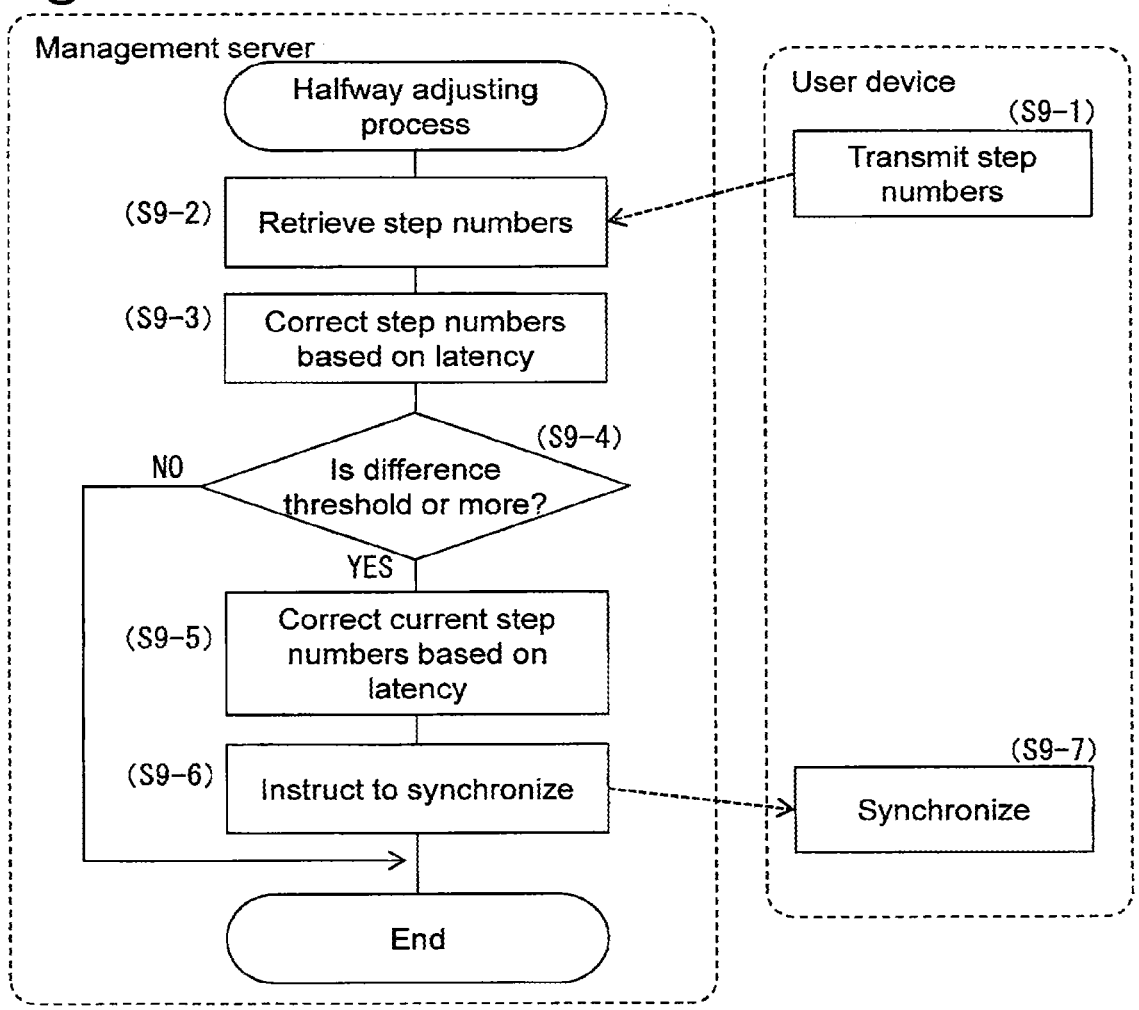

The halfway adjusting process will be described with reference to FIG. 8.

At first, the user device 10 periodically performs a step number transmission process herein (step S9-1). Specifically, the game processing unit 12 periodically transmits the current step number to the management server 20.

In this case, the control unit 21 performs the step number retrieving process (step S9-2). Specifically, the game management unit 213 periodically retrieves the current step number from the user device 10 of each client.

The control unit 21 then performs the step number correction process based on latency (step S9-3). Specifically, the game management unit 213 retrieves the latency of the user device 10 of which the current step number is retrieved from the connection state storage unit 23. Then, the game management unit 213 calculates a value (delay step number) obtained by dividing the latency by a step unit time. The game management unit 213 adds the delay step number to the current step number, thereby calculating a local step number.

The control unit 21 then performs a determination process as to whether a difference is at a threshold or more (step S9-4). Specifically, the game management unit 213 calculates the difference between the server step number when the current step number is retrieved from the user device 10 and the local step number. The game management unit 213 compares the difference with the threshold.

When determining that the difference is lower than the threshold ("NO" in step S9-4), the control unit 21 terminates the halfway adjusting process.

On the other hand, when determining that the difference is at the threshold or more ("YES" in step S9-4), the control unit 21 performs the current step number correction process based on latency (step S9-5). Specifically, the game management unit 213 calculates a corrected step number in which the delay step number is added to the current server step number.

The control unit 21 then performs a synchronization instruction process (step S9-6). Specifically, the game management unit 213 transmits a synchronization instruction to the user device 10 that has retrieved a step number. The synchronization instruction includes data on the corrected step number.

The user device 10 that has retrieved the synchronization instruction performs a synchronization process (step S9-7). Specifically, the game processing unit 12 skips the steps of the game progress that precede the corrected step number retrieved from the management server 20. Thereby, when the game progress at the management server 20 is offset from the game progress at the client of the delayed user device 10, the progress states are synchronized.

In the above illustrated embodiment, the user devices 10 of the clients A to C are assumed to play the game in one group. The group may be generated in consideration of values of latency. A grouping process is performed for generating a group in which clients of which the values of latency are within a predetermined range are put together.

Figure 9:
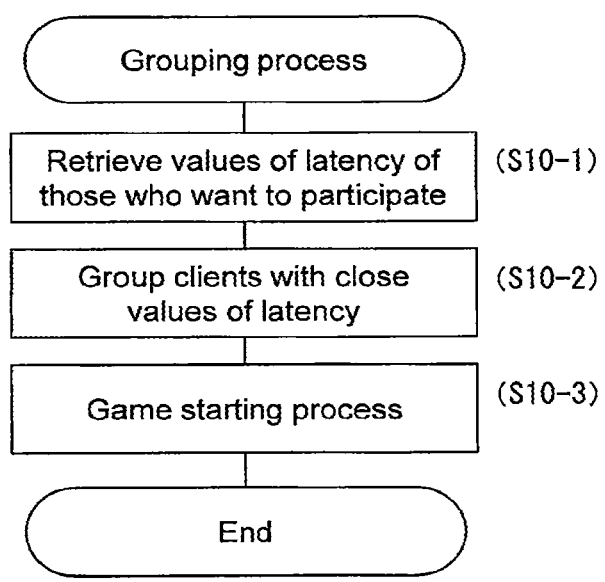

The grouping process will be described with reference to FIG. 9.

At first, the control unit 21 performs a latency retrieving process for those who want to participate (step S10-1). Specifically, the game management unit 213 retrieves the latency of a client who wants to participate in the game from the user device 10.

The control unit 21 then performs a group creation process on clients with close values of latency (step S10-2). Specifically, the game management unit 213 identifies clients whose retrieved values of latency are within a predetermined range. The game management unit 213 registers the identified clients as one group in the game information storage unit 24.

Figure 3:
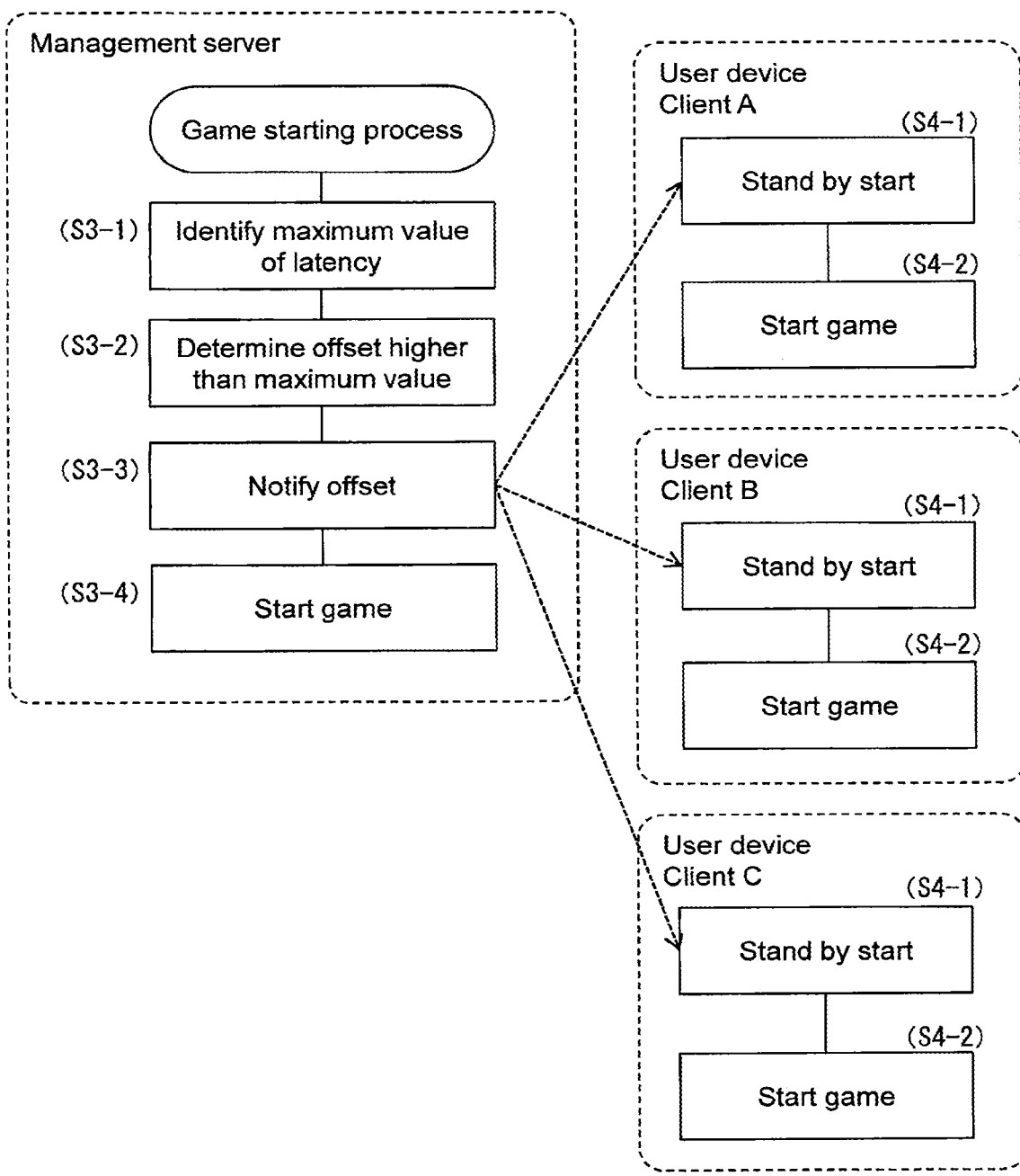

The control unit 21 then performs the game starting process illustrated in FIG. 3 (step S10-3).

Thereby, the clients with less different values of latency can play the game, thereby easily synchronizing the game progress. A variation in delay time can be restricted and the game progress can be efficiently synchronized.

A group may be created in consideration of attributes of the users (such as game skill or level of user's game character). In this case, the control unit 21 identifies common users (group candidates) based on the attributes stored in the user information storage unit 22. The control unit 21 performs the grouping process for the users in the group candidates, thereby creating a group made of clients with close values of latency.

The invention claimed is:

1. A game management system connected to a plurality of client devices, the game management system comprising:
circuitry configured to
manage progress of a game played by a group,
continuously obtain a delay time from each of the plurality of client devices executing the game and store the delay times, the plurality of client devices including a first client device,
calculate a dispersion of the delay times of the plurality of client devices,
determine a threshold depending on the dispersion, the threshold being increased when the dispersion is lower than a predetermined value, and the threshold being decreased when the dispersion is higher than a predetermined value, and
in response to a first delay time of the stored delay times obtained from the first client device being less than or equal to the threshold, execute a request from the first client device.

2. The game management system of claim 1, wherein the first delay time is a latest one of the stored delay times obtained from the first client device.

3. The game management system of claim 1, wherein the circuitry is further configured to determine client abnormality based on the threshold.

4. The game management system of claim 1, wherein the circuitry is further configured to
compare the first delay time with the threshold, and
in response to the first delay time being less than or equal to the threshold, execute the request from the first client device.

5. The game management system of claim 1, wherein the circuitry is further configured to transmit an instruction to synchronize the progress of the game to the plurality of client devices, the instruction including an offset time based on a maximum value of the stored delay times.

6. The game management system of claim 5, wherein the circuitry is further configured to transmit the instruction to synchronize the progress of the game, thereby synchronizing the progress of the game between the game management system and each of the plurality of client devices.

7. The game management system of claim 1, wherein the circuitry is further configured to, in response to the first delay time being less than or equal to the threshold, execute the request from the first client device, thereby restricting effects by one or more of the plurality of client devices that have large delay times to the progress of the game in the game management system.

8. The game management system of claim 1, wherein the circuitry is further configured to
obtain a delay time from each client device of a set of client devices from the plurality of client devices and store the delay times, the set of client devices requesting to participate in a game, and
determine a group in which a same game is played based on a latest delay time for each client device of the set of client devices.

9. A method of managing a game, the method comprising:
managing progress of a game played by a group;
continuously obtaining a delay time from each of a plurality of client devices executing the game and storing the delay times, the plurality of client devices including a first client device;
calculating a dispersion of the delay times of the plurality of client devices;
determining a threshold depending on the dispersion, the threshold being increased when the dispersion is lower than a predetermined value, and the threshold being decreased when the dispersion is higher than a predetermined value; and
in response to a first delay time of the stored delay times obtained from the first client device being less than or equal to the threshold, executing a request from the first client device.

10. The method of claim 9, wherein the first delay time is a latest one of the stored delay times obtained from the first client device.

11. The method of claim 9, further comprising determining client abnormality based on the threshold.

12. The method of claim 9, further comprising transmitting an instruction to synchronize the progress of the game to the plurality of client devices, the instruction including an offset time based on a maximum value of the stored delay times.

13. The method of claim 9, further comprising:
obtaining a delay time from each client device of a set of client devices from the plurality of client devices and storing the delay times, the set of client devices requesting to participate in a game; and
determining a group in which a same game is played based on a latest delay time for each client device of the set of client devices.

14. A non-transitory computer-readable medium including a program, which when executed by circuitry, causes the circuitry to:
manage progress of a game played by a group;
continuously obtain a delay time from each of a plurality of client devices executing the game and store the delay times, the plurality of client devices including a first client device;
calculate a dispersion of the delay times of the plurality of client devices;
determine a threshold depending on the dispersion, the threshold being increased when the dispersion is lower than a predetermined value, and the threshold being decreased when the dispersion is higher than a predetermined value; and
in response to a first delay time of the stored delay times obtained from the first client device being less than or equal to the threshold, execute a request from the first client device.

* * * * *